United States Patent
Beesley et al.

(10) Patent No.: US 6,668,888 B1
(45) Date of Patent: Dec. 30, 2003

(54) CENTRAL TIRE INFLATION SYSTEM FOR STEERING DRIVE AXLE

(75) Inventors: Peter A. Beesley, Fort Wayne, IN (US); Darren Fugett, Larwill, IN (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 10/198,159

(22) Filed: Jul. 19, 2002

(51) Int. Cl.[7] .................. B60C 23/10; B60C 29/00
(52) U.S. Cl. ................ 152/417; 152/415; 152/427
(58) Field of Search ................ 152/415, 416, 152/417, 427, 428; 180/252, 253, 267

(56) References Cited

U.S. PATENT DOCUMENTS

| | | | | |
|---|---|---|---|---|
| 4,282,949 A | * | 8/1981 | Kopich et al. | 180/252 |
| 4,431,043 A | * | 2/1984 | Goodell et al. | 152/417 |
| 4,434,833 A | | 3/1984 | Swanson et al. | |
| 4,582,107 A | * | 4/1986 | Scully | 152/417 |
| 4,705,090 A | | 11/1987 | Bartos | |
| 4,733,707 A | | 3/1988 | Goodell et al. | |
| 4,932,451 A | | 6/1990 | Williams et al. | |
| 5,080,156 A | * | 1/1992 | Bartos | 152/417 |
| 5,174,839 A | * | 12/1992 | Schultz et al. | 152/415 |
| 5,203,391 A | * | 4/1993 | Fox | 152/416 |
| 5,353,890 A | * | 10/1994 | Clohessy | 180/247 |
| 6,182,727 B1 | | 2/2001 | Beesley | |
| 6,199,611 B1 | * | 3/2001 | Wernick | 152/417 |
| 6,220,325 B1 | | 4/2001 | Saibold et al. | |
| 6,283,186 B1 | | 9/2001 | Krisher | |
| 6,325,123 B1 | | 12/2001 | Gao et al. | |
| 6,363,985 B1 | * | 4/2002 | Beesley | 152/417 |

* cited by examiner

*Primary Examiner*—S. Joseph Morano
*Assistant Examiner*—Jason R. Bellinger
(74) *Attorney, Agent, or Firm*—Liniak, Berenato & White (57) ABSTRACT

A central tire inflation system for live spindle wheel ends comprising a steering knuckle secured to a vehicle, and a spindle assembly rotatably mounted about the steering knuckle. A drive shaft is rotatably disposed through the steering knuckle and is in driving connection with the spindle assembly. A rubbing slip-ring seal is mounted into a flange of the steering knuckle and defines a seal chamber between the knuckle flange on one side and the drive shaft and the spindle assembly on the other side. An inlet passageway is formed directly through the steering knuckle in communication with the seal chamber. The inlet passageway transmits pressurized air from a pressurized air source directly to the seal chamber. An outlet passageway is formed directly through the spindle assembly and is also in direct communication with the seal chamber to establish communication between the seal chamber and a pneumatic tire.

15 Claims, 7 Drawing Sheets

CENTRAL TIRE INFLATION SYSTEM FOR STEERING DRIVE AXLE

BACKGROUND OF THE INVENTION

1. Field of the Invention

The present invention relates to vehicle live hub wheel end systems in general, and, more particularly, to a central tire inflation system for steering live hub wheel ends.

2. Description of the Prior Art

Central tire inflation systems (CTIS) are becoming popular with the trucking industry, especially for off-road vehicles. Various types of tire inflation system have been developed both for trailer axles and tractor drive axles.

The central tire inflation system allows the operator to control the air pressure of the tires for improved performance of the tires and of the vehicle. However, the central tire inflation systems currently available suffer from two primary drawbacks. The axle and hub and possibly other parts must be extensively modified in order to accommodate a conventional system.

The off-road vehicles often drive on soft, muddy surfaces and then switch to harder surfaces, such as paved roads. To obtain proper traction on soft, muddy surfaces, the tire should be operated at a relatively low pressure. To obtain proper traction and optimal fuel mileage on harder surfaces, the tires should be operated at relatively high pressures. The differences between preferred high tire pressures (hard surfaces) and preferred low tire pressures (soft surfaces) may be quite large. For example, some truck tire manufacturers recommend a maximum tire pressure of 120 psi for highway conditions and 8 to 15 psi for extremely soft conditions such as sand, mud and swamps. A tire pressure for intermediate road conditions may be approximately 40 psi. Of course, in the case of trailers, the preferred tire pressure will also be dependent upon the weight of the goods or equipment carried in the trailer.

The central tire inflation system is adapted to provide compressed air from a remote pressurized air source to a pneumatic tire of a motor vehicle. Since the tire is rotating and the pressurized air source is stationary, the typical tire inflation system includes some kind of sealing means located between a stationary hub member of the wheel end assembly and a rotating tire-mounting hub. The typical tire inflation system also is provided with a conduit that extends from the sealing means through the wheel end assembly to the pneumatic tire. It has been found particularly difficult to design the tire inflation system for live hub wheel ends, especially for the live hub wheel ends of front drive/steering axles wherein pressurized air is transmitted from the fixed inflation air source to pneumatic tires mounted on steering wheels of the drive axle.

Current systems are quite complex, cumbersome and expensive, and require a great deal of changes in the current production wheel end design.

SUMMARY OF THE INVENTION

The present invention alleviates the drawbacks of the prior art. The present invention provides a central tire inflation system for a steering live hub wheel end assembly providing a unique arrangement for a steering driving axle of a motor vehicle that minimizes changes in the current production wheel end designs.

In the preferred embodiment disclosed, the live wheel end assembly comprises a steering knuckle secured to the vehicle, and a spindle assembly rotatably mounted about the steering knuckle. An inlet passageway is formed directly through the steering knuckle. The bearing assembly receives the coaxial spindle assembly to which a pneumatic tire is mounted. A drive shaft is rotatably disposed through the steering knuckle and is in driving connection with the spindle assembly.

The spindle assembly has a central axial bore provided with a spline section. The drive shaft has a spline portion and a flange portion. The drive shaft is inserted through the central spindle bore such that respective splined portions form a spline connection.

A rubbing slip-ring seal assembly is mounted into a flange of the steering knuckle. The slip-ring seal assembly includes a pair of axially spaced rotary seal members and defines a seal chamber therebetween. The first seal member is in sliding sealing contact with an outer peripheral surface of a sealing lip portion of the spindle assembly, while the second seal member is in sliding sealing contact with an outer peripheral surface of the flange portion of the drive shaft.

The inlet passageway transmits pressurized air from a pressurized air source directly to the sealed chamber. An outlet passageway is formed directly through the spindle assembly and is also in direct communication with the seal chamber to establish communication between the seal chamber and a pneumatic tire.

In accordance with the first exemplary arrangement of the present invention, the spindle assembly includes a wheel hub member and a coupling ring member adapted to drivingly couple the drive shaft to the wheel hub member. In this embodiment, the outlet passageway is formed directly through the coupling ring member, and the first seal member is in sliding sealing contact with an outer peripheral surface of a sealing lip portion thereof.

In accordance with the second exemplary arrangement of the present invention, the spindle assembly includes a wheel hub member directly drivingly coupled to the drive shaft. In this embodiment, the outlet passageway is formed directly through the wheel hub member, and the first seal member is in sliding sealing contact with an outer peripheral surface of a sealing lip portion thereof.

Therefore, the arrangement of the central tire inflation system for the steering live hub wheel end assembly in accordance with the present invention provides a shortened reliable flow path between the steering knuckle and the spindle assembly in the live spindle wheel end assembly. The present design also requires less seals than the related art and provides a simpler arrangement reducing manufacturing costs and assembly time to provide an overall superior seal interface arrangement reducing potential leakage and increasing reliability. Other objects and advantages of the invention will become apparent from a study of the following specification when viewed in light of the accompanying drawings.

These and other benefits of the present invention will become apparent from the following description and associated drawings.

DESCRIPTION OF THE PREFERRED EMBODIMENT

A central tire inflation system (CTIS) in which pressurized air and rotating tires are controlled through a sealed air connection between a pressurized air supply and each of the tires on a live spindle wheel end assembly of a drive/steering axle and such a disclosure is provided by this invention.

Figure 1:
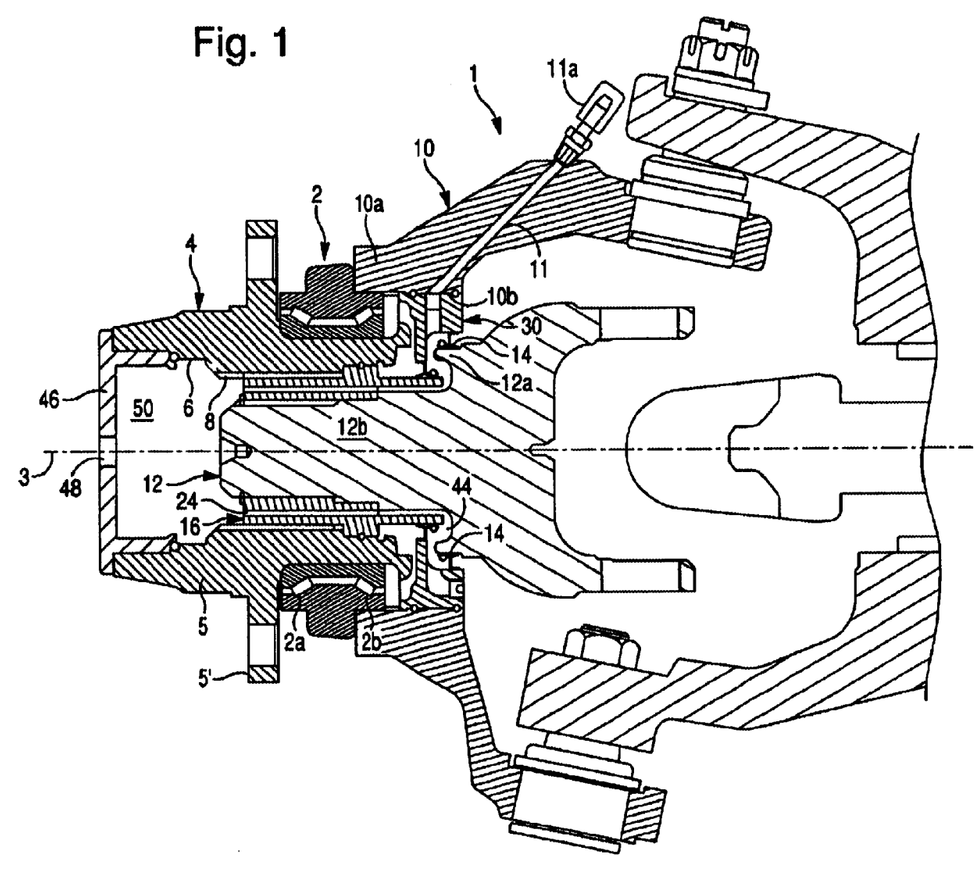
FIG. 1 is a cross-sectional view of a live spindle wheel end assembly with a central tire inflation system in accordance with the first exemplary embodiment of the present invention.

FIG. 1 depicts the live spindle wheel end assembly of the front drive/steering axle of a motor vehicle adapted to support wheels (not shown) for both driving and steering. It will be appreciated that the present invention is equally applicable to a rear drive/steering axle.

The live spindle wheel end assembly of the present invention, designated generally at 1, comprises a bearing assembly 2 and a spindle assembly 4 supported coaxially within the bearing assembly 2 by a pair of roller bearings 2a and 2b for rotation about an axis of rotation 3. The wheel end assembly 1 of the present invention, being of driving type, further includes a drive shaft 12 drivingly coupled to the spindle assembly 4 for transmitting a drive torque from a prime mover (not shown), such as a conventional internal combustion engine, to a drive wheel. The wheel end assembly 1 of the present invention being steering, also includes a steering knuckle 10 actuated through a steering arm (not shown). The bearing assembly 2 is conventionally secured to the steering knuckle 10 by any appropriate means well known in the art. In turn, the steering knuckle 10 is secured to a vehicle suspension system through a conventional king pin assembly or other conventionally known means (not shown). A pressurized air path to the pneumatic tire begins with an inlet air passageway 11 formed through the steering knuckle 10. A pressurized air supply line (not shown) is conventionally attached to the inlet passageway 11 through an inlet fitting 11a.

The spindle assembly 4, in turn, includes a wheel hub member 5 and a coupling ring member 16 adapted to drivingly couple the drive shaft 12 to the wheel hub member 5. The wheel hub member 5 has a central bore 6 having a substantially cylindrical splined portion 8. A wheel with a pneumatic tire (not shown) is mounted to a flange 5' of the wheel hub member 5.

The drive shaft 12 comprises a substantially cylindrical flange portion 12a and a splined end 12b adapted to positively, non-rotatably engage the spindle assembly 4. The flange portion 12a of the drive shaft 12 has a substantially cylindrical outer peripheral surface 14.

The steering knuckle 10 is provided with a knuckle flange 10a forming a substantially cylindrical inner peripheral surface 10b substantially coaxial with the outer peripheral surface 14 of the flange portion 12a of the drive shaft 12, but being radially spaced therefrom, as illustrated in FIG. 1.

The coupling ring member 16 is disposed within the central bore 6 of the wheel hub member 5 between the splined portion 8 thereof and the splined end 12b of the drive shaft 12 and is adapted to drivingly couple the drive shaft 12 to the wheel hub member 5. As illustrated in details in FIGS. 2–4, the coupling ring member 16 has a body 17 that includes a substantially cylindrical splined portion 18, a mounting portion 20, and a substantially annular sealing lip portion 22. Preferably, the body 17 of the coupling ring member 16 is manufactured as a unitary, single-piece component.

Figure 2:
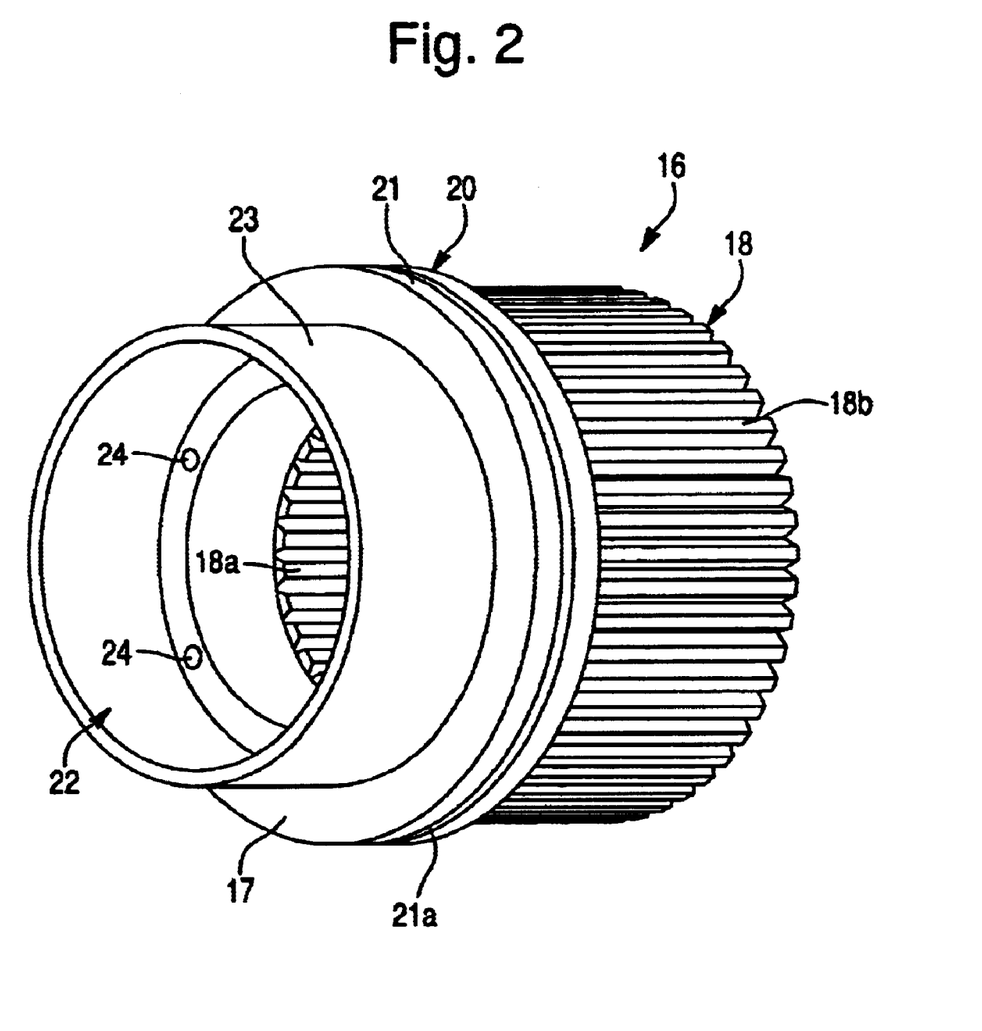
FIG. 2 is a perspective view of a coupling ring member in accordance with the first exemplary embodiment of the present invention.
Figure 3:
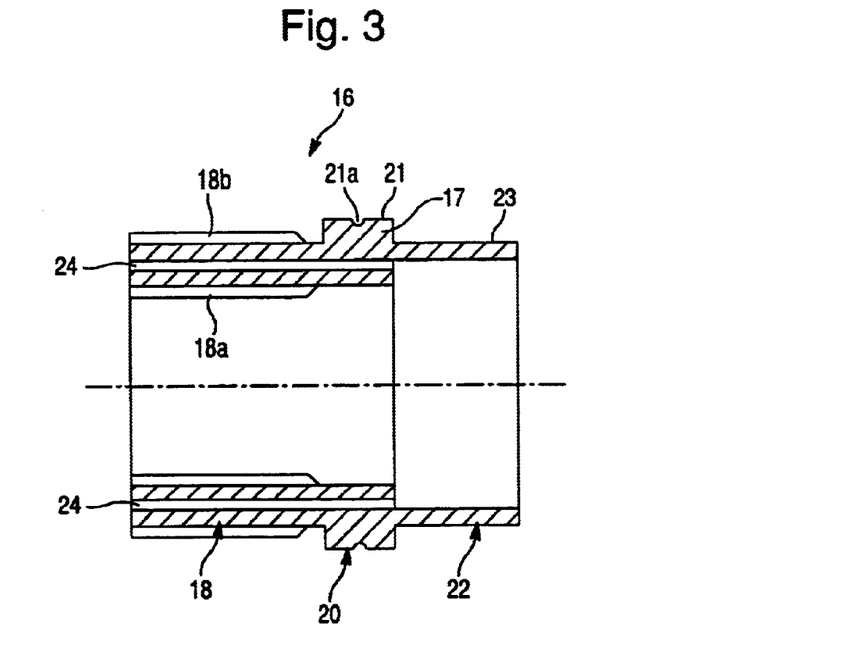
FIG. 3 is a cross-sectional view of the coupling ring member in accordance with the first exemplary embodiment of the present invention.
Figure 4:
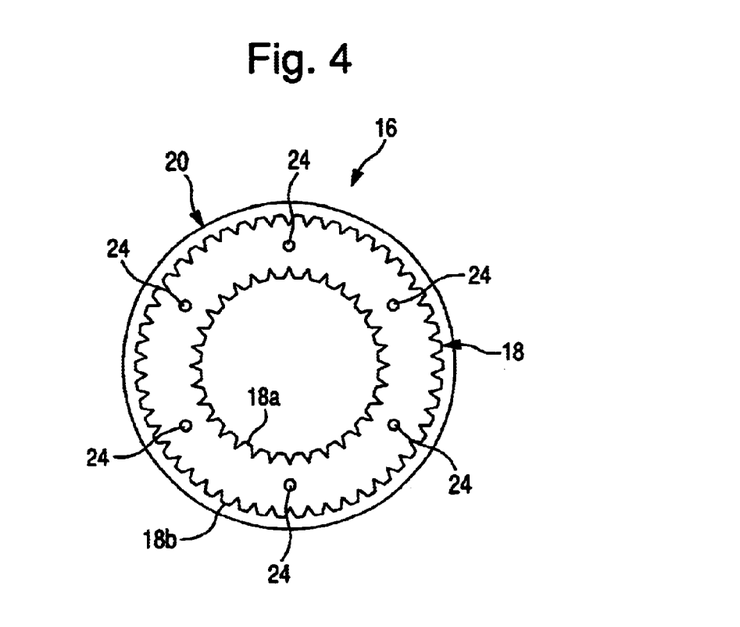
FIG. 4 is a front view of the coupling ring member in accordance with the first exemplary embodiment of the present invention.

The splined portion 18 of the coupling ring member 16 includes a plurality of inner splines 18a adapted to engage splines of the splined end 12b of the drive shaft 12 in order to provide non-rotatable connection therebetween, and a plurality of outer splines 18b adapted to engage splines of the splined portion 8 of the wheel hub member 5 in order to provide non-rotatable connection therebetween. It will be appreciated by those of ordinary skill in the art that any other appropriate means to non-rotatably couple the drive shaft 12 to the wheel hub member 5 are within the scope of the present invention.

The mounting portion 20 disposed adjacent to the splined portion 18 has a substantially cylindrical outer peripheral surface 21 provided with an annular groove 21a adapted to receive an O-ring sealing member well known to those skilled in the art. Thus, the coupling ring member 16 sealingly engages the central bore 6 of the wheel hub member 5 outside the splined portion 8 thereof.

The sealing lip portion 22 axially extends from the mounting portion 20 substantially coaxially with the drive shaft 12. Moreover, sealing lip portion 22 is radially spaced from the drive shaft 12, as illustrated in FIG. 1. Preferably, an outer peripheral surface 23 of the sealing lip portion 22 is substantially cylindrical.

Referring now back to FIG. 1, a hubcap 46 is removably secured to an outboard end of the wheel hub member 5 by any appropriate means known in the art for sealingly closing an outboard end of the the central bore 6 thereof. Thus, an air pressure chamber 50 is defined within the central bore 6 of the wheel hub member 5 between the drive shaft 12 and the coupling ring member 16 on one side, and the hubcap 46 on the other side. The hubcap 46 is provided with a central hole 48 providing fluid communication between the air pressure chamber 50 and an interior space of the pneumatic tire through a fitting (not shown) coupled by an outlet air tube (not shown) to the pneumatic tire.

The present invention further includes a rubbing slip-ring seal assembly 30 preferably mounted to the steering knuckle to distribute pressurized air from a source of pressurized air on the vehicle to the pneumatic tire mounted on the wheel hub member 4. More specifically, the slip-ring seal assembly 30 fluidly couples the stationary inlet passageway 11 in the steering knuckle 10 with the air pressure chamber 50 and, subsequently, the rotating pneumatic tire.

Figure 5:
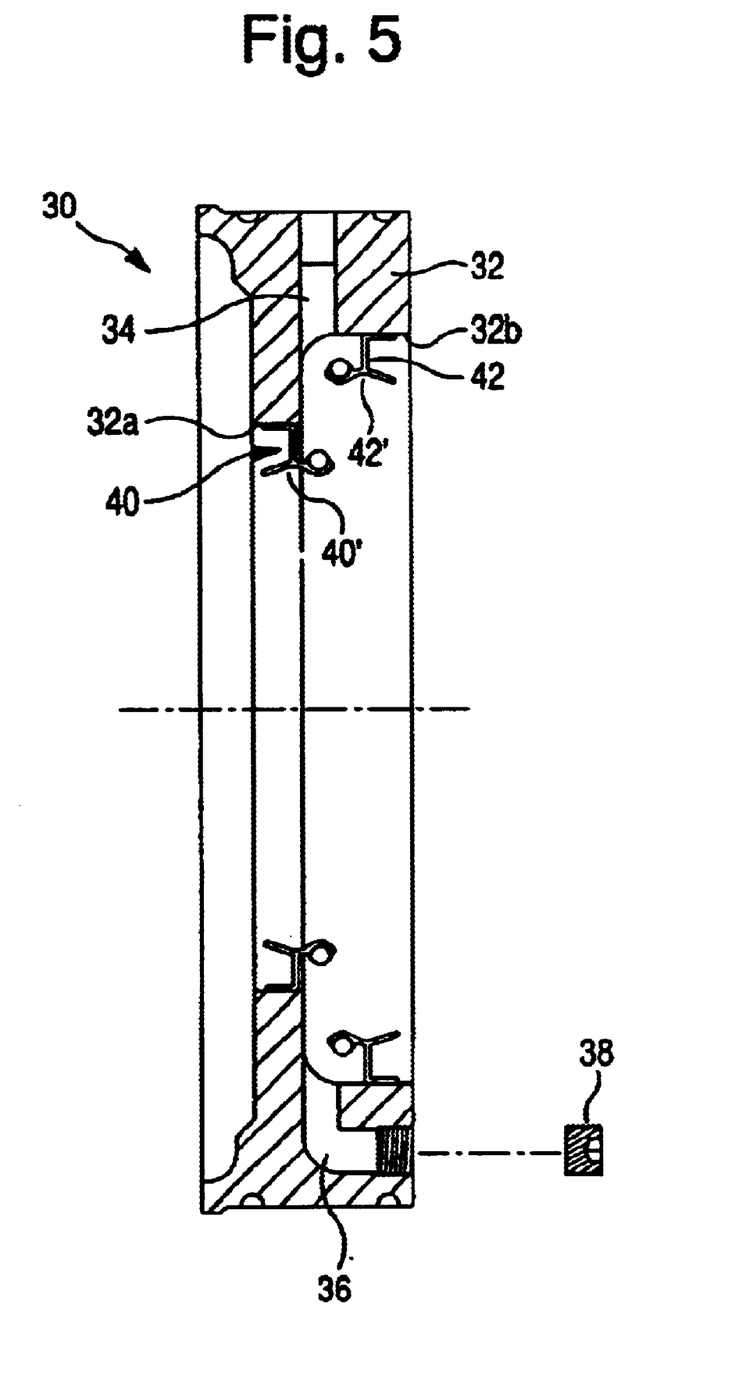
FIG. 5 is a cross-sectional view of a slip-ring seal assembly of the present invention.
Figure 6:
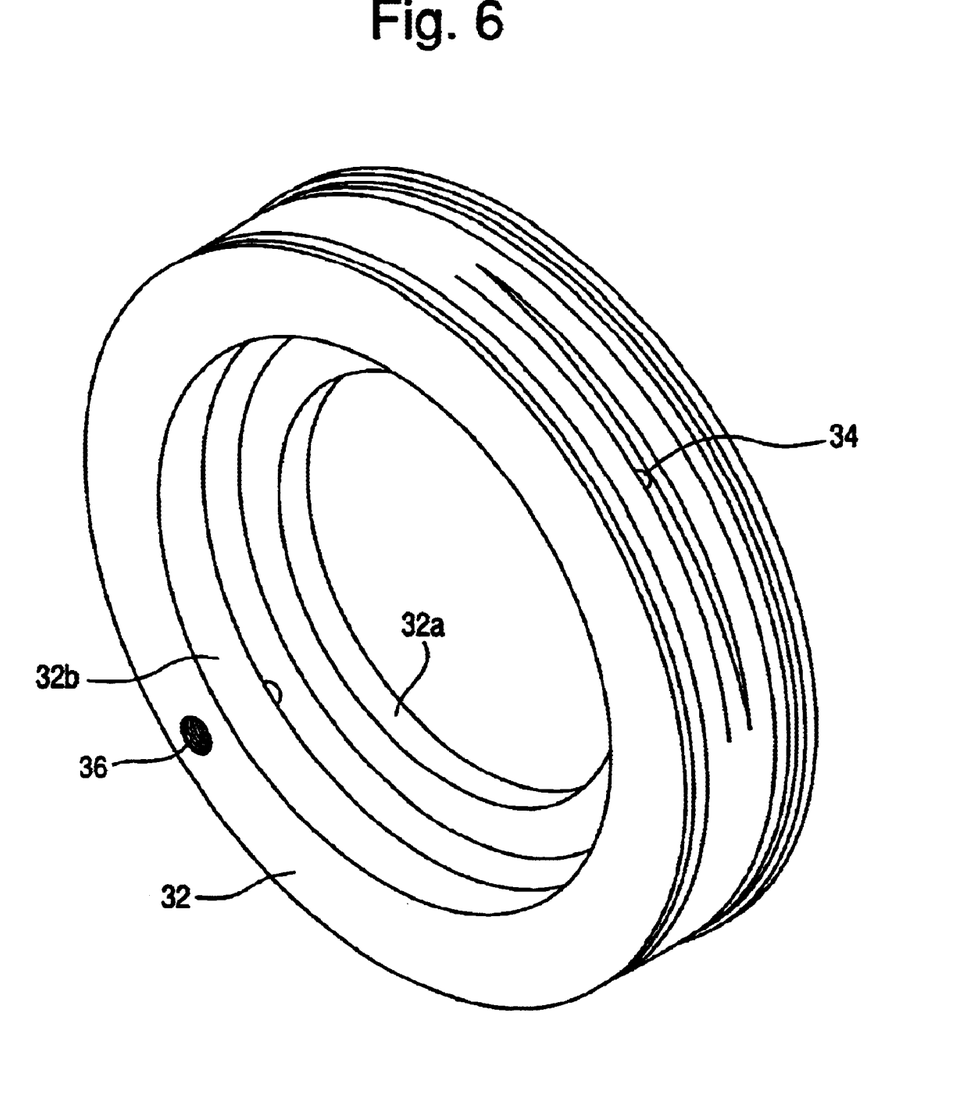
FIG. 6 is a perspective view of a seal carrier of the present invention.

Preferably, as illustrated in details in FIG. 5, the slip-ring seal assembly 30 comprises a substantially annular seal carrier 32 (shown in FIG. 6) non-rotatably mounted to the inner cylindrical peripheral surface 10b of the knuckle flange 10a by any other appropriate manner well known to those skilled in the art.

The slip-ring seal assembly 30 further comprises a pair of axially spaced, annular seal members mounted to the seal carrier 32: a first seal member 40 and a second seal member 42. The first seal member 40 is mounted to a first mounting surface 32a of the seal carrier 32 and extends substantially radially inwardly therefrom, while the second seal member 42 is mounted to a second mounting surface 32b of the seal carrier 32 and extends substantially radially inwardly therefrom. Both first and second seal members 40 and 42 are mounted to the corresponding mounting surfaces 32a and 32b of the seal carrier 32 by press fitting or any other appropriate manner well known to those skilled in the art.

Moreover, innermost ends of the first and second seal members 40 and 42 are provided with sealing faces 40' and 42' respectively. The sealing faces 40' and 42' are formed with an appropriate spring-loaded rubber sealing member, and preferably a Teflon or other wear resistant surface is provided at the sealing interface. In the preferred embodiment, the sealing member is designed to withstand a pressure spike of about 125–130 psi. Of course, the exact sealing specifications may be altered to satisfy the sealing conditions at hand.

As illustrated in FIG. 1, the sealing face 40' of the first seal member 40 is in sliding (or frictional) sealing contact with the outer peripheral surface 23 of the sealing lip portion 22 of the coupling ring member 16, while the sealing face 42' of the second seal member 42 is in sliding (or frictional) sealing contact with the outer peripheral surface 14 of the flange portion 12a of the drive shaft 12. Thus, as illustrated in FIG. 1, the first and second seal members 40 and 42 are forming a substantially annular, rolling seal chamber 44 that is a space defined by the first and second seal members 40 and 42, the seal carrier 32, the drive shaft 12 and the coupling ring member 16 of the spindle assembly 4.

Furthermore, the annular seal carrier 32 of the slip-ring seal assembly 30 includes a communication hole 34 aligned with the inlet passageway 11 in the steering knuckle 10, thus providing a fluid communication between the inlet passageway 11 and the rolling seal chamber 44. Also, the seal carrier 32 has a drain passage 36 provided to remove any contamination from the seal chamber 44. As shown in FIG. 1, one end of the drain passage 36 is open to the seal chamber 44, while the other end thereof is open to the area external to the seal chamber 44 and is adapted to be closed by a removable closure, such as a threaded plug 38.

In order to provide a fluid communication between the rolling seal chamber 44 and the pneumatic tire, the spindle assembly 4 includes at least one outlet passageway formed therethrough. In the first exemplary embodiment of the present invention, a plurality of outlet passageways, designated generally at 24, is formed through the body 17 of the coupling ring member 16 so that an inboard open end of the outlet passageway 24 is in fluid communication with the seal chamber 44, while an outboard open end of the outlet passageway 24 is open to the air pressure chamber 50. Preferably, the body 17 of the coupling ring member 16 is provided with six outlet passageways 24, as illustrated in FIG. 4.

Therefore, as the wheels rotate, a continuous air passage through the steering live spindle wheel end assembly is achieved. Again, with the reference in FIG. 1, the central tire inflation system can communicate with the fitting 11a through the wheel end assembly 1 to permit inflation and deflation of the tire. The overall path includes the inlet air passageway 11 through the steering knuckle 10, the annular seal chamber 44, past the first and second seal members 40 and 42 while their sealing faces engage to the rotational components 12 and 16 to prevent escape of the air, the outlet passageways 24 through the coupling ring member 16 of the spindle assembly 4, and the air pressure chamber 50 which is in fluid communication with the interior space of the pneumatic tire through the central hole 48 in the hubcap 46.

The vehicle air supply will now be described. The onboard tire pressure inflation system may comprise a control that will typically be located in the vehicle operator's cab. The control may have a lever that is selectively movable to two or more positions for selecting a desired tire pressure. Typically, in a heavy duty vehicle, in highway (i.e. over-the-road) conditions it is desired that the driving tires be inflated to a pressure of about 75 pounds per square inch, in off-the-road conditions it is desired that the driving tires be inflated to a pressure of about 40 pounds per square inch and for desert operating conditions it is desired that the tires be inflated to a pressure of about 8–14 pounds per square inch. Of course, other pressures and/or other settings may be selected by the control and will fall within the scope of the present invention. The control may also include an infinitely variable control member whereby the operator may select any pressure within a given range of pressures. The control is attached to a pressure regulator by a line, which may be hydraulic and/or electric, or the like. The pressure regulator is connected to a source of pressurized fluid by a fluid connection and to a vent or exhaust. The pressure regulator will supply selectively pressurized fluid to the inlet fitting 11a, which communicates with the tire inflation system shown in FIG. 1. Pressure regulator is effective to supply pressurized fluid-to-fluid connections, or to vent fluid connections, in accordance with the setting of control. A pressure gauge may also be provided, preferably in the operator's cab, indicating the pressure level of pressurized fluid in the system. Typically, the pressurized fluid will be pressurized air and the source of pressurized fluid will be the vehicles onboard air system and/or a pressurized air accumulator.

To inflate the tire(s), a positive pressure is applied to the inboard side of the stationary component. Air is thereby delivered to the rotational component through the interface created by the two high-pressure seals. A hose then delivers the air to the tire for inflation. To deflate the tire(s), a negative pressure is applied to the inboard side of the stationary component; thereby reducing the air pressure in the tire(s).

Figure 7:
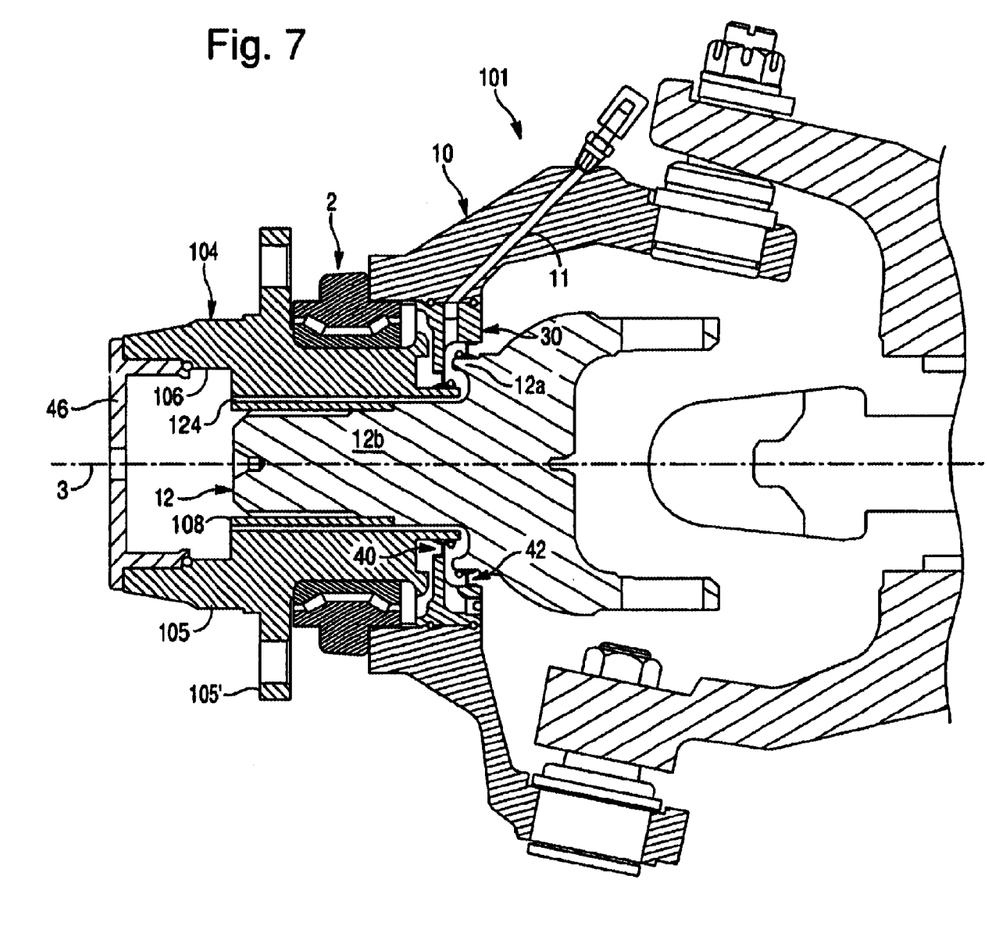
FIG 7 is a cross-sectional view of a live spindle wheel end assembly with a central tire inflation system in accordance with the second exemplary embodiment of the present invention.
Figure 8:
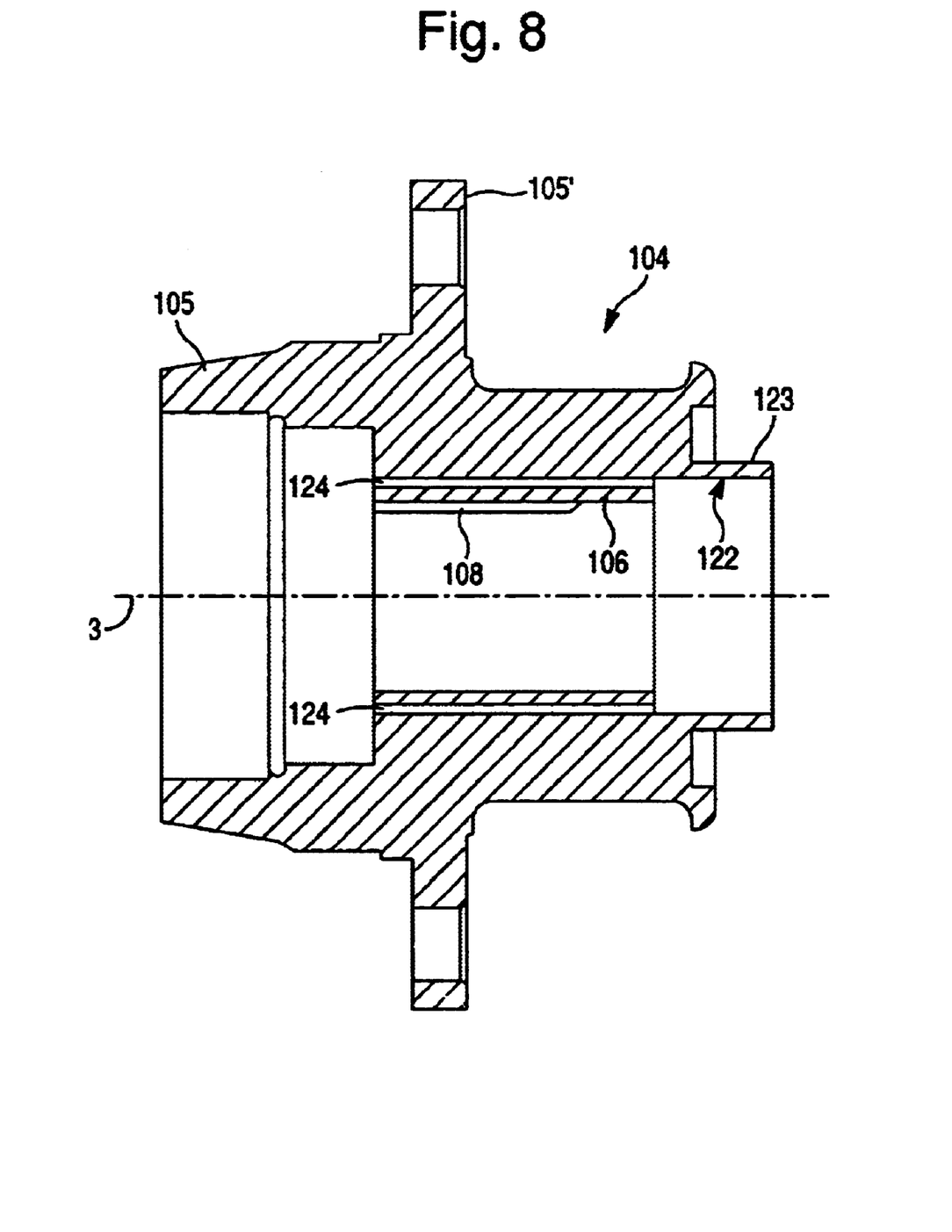
FIG. 8 is a cross-sectional view of a wheel hub member in accordance with the second exemplary embodiment of the present invention.

FIGS. 7–8 of the drawings illustrates a second exemplary embodiment of a live spindle wheel end assembly of the front drive/steering axle of the motor vehicle in accordance with the present invention, generally indicated at 101. Components, which are unchanged from, or function in the same way as in the exemplary embodiment depicted in FIGS. 1–6 are labeled with the same reference numerals sometimes without describing in details since the reader will readily perceive similarities between the corresponding parts in the two embodiments. The steering live spindle wheel end assembly of FIG. 7 corresponds substantially to the live spindle wheel end assembly of FIG. 1, and only the spindle assembly, which differs, will therefore be explained in detail below.

As illustrated in FIG. 8, a spindle assembly 104 includes a wheel hub member 105 directly drivingly coupled to the drive shaft 12. The wheel hub member 105 has a central bore 106 having a substantially cylindrical splined portion 108. A wheel with a pneumatic tire (not shown) is mounted to a flange 105' of the wheel hub member 105.

Splines of the splined portion 108 of the wheel hub member 105 are adapted to engage splines of the splined end 12b of the drive shaft 12 in order to provide non-rotatable connection therebetween. It will be appreciated by those of ordinary skill in the art that any other appropriate means to non-rotatably couple the drive shaft 12 to the wheel hub member 105 are within the scope of the present invention.

As illustrated in FIG. 8, the wheel hub member 105 further includes a substantially annular sealing lip portion 122 axially extending therefrom and formed integrally therewith. Preferably, the hub member 105 and the annular sealing lip portion 122 are manufactured as a unitary, single-piece component, as shown in FIG. 8.

As illustrated in FIG. 7, the sealing face 40' of the first seal member 40 of the slip-ring seal assembly 30 is in sliding (or frictional) sealing contact with an outer peripheral surface 123 of the sealing lip portion 122 of the wheel hub member 105.

In order to provide a fluid communication between the rolling seal chamber 44 and the pneumatic tire, the spindle assembly 104 of the second exemplary embodiment of the present invention, includes at least one outlet passageway 124 formed through the wheel hub member 105 so that an inboard open end of the outlet passageway 124 is in fluid communication with the seal chamber 44, while an outboard open end of the outlet passageway 124 is open to the air pressure chamber 50. Preferably, the wheel hub member 105 is provided with six outlet passageways 124.

Therefore, a continuous air passage through the steering live spindle wheel end assembly is achieved. Again, with the reference in FIG. 7, the central tire inflation system can communicate with the fitting 11a through the wheel end assembly 101 to permit inflation and deflation of the tire. The overall path includes the inlet air passageway 11 through the steering knuckle 10, the annular seal chamber 44, the outlet passageways 124 through the wheel hub member 105 of the spindle assembly 104, and the air pressure chamber 50 which is in fluid communication with the interior space of the pneumatic tire through the central hole 48 in the hubcap 46.

Therefore, the steering live spindle wheel end assembly of the drive/steering axle of the motor vehicle in accordance with the present invention is well adapted to carry out the objects and attain the ends and advantages mentioned as well as others inherent therein.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It will also be understood that words used are words of description rather than a limitation. It is also intended that the scope of the present invention be defined by the claims appended thereto.

What is claimed is:

1. A vehicle steering live spindle wheel end assembly (1) including a tire inflation system providing pressurized air to a pneumatic tire directly through said wheel end assembly (1), said wheel end assembly (1) comprising:

a steering knuckle (10) having an inlet passageway (11) formed directly therethrough, said inlet passageway (11) connected to a source of pressurized air;

a spindle assembly (4) rotatably mounted to said steering knuckle (10) and having at least one outlet passageway (24) formed therethrough; said at least one outlet passageway (24) being in fluid communication with a pneumatic tire at an outward end of said at least one outlet passageway (24);

a drive shaft (12) rotatably mounted within said steering knuckle (10) and drivingly coupled to said spindle assembly (4);

a slip-ring seal assembly (30) including a first seal member (40) disposed between said steering knuckle (10) and said spindle assembly (4) and a second seal member (42) disposed between said steering knuckle (10) and said drive shaft (12), said first and second seal members (40 and 42) being axially spaced from one another so as to define a rolling seal chamber (44) between said first and second seal members (40 and 42);

wherein both said inlet passageway (11) and said outlet passageway (24) are in fluid communication with said rolling seal chamber (44) thereby establishing a fluid communication path between said source of pressurized air and said pneumatic tire, and wherein said slip-ring seal assembly (30) further includes a seal carrier (32) non-rotatably mounted to said steering knuckle (10) and provided for supporting said first and second seal members (40 and 42) thereon in an axially spaced relationship.

2. The steering live spindle wheel end assembly (1) as defined in claim 1, wherein said seal carrier (32) includes a communication hole (34) aligned with said inlet passageway (11) in said steering knuckle (10) to provide a fluid communication between said inlet passageway (11) and said rolling seal chamber (44).

3. The steering live spindle wheel end assembly (1) as defined in claim 1, wherein said seal carrier (32) includes a drain passage (36) provided to remove any contamination from said seal chamber (44), a first end of said drain passage (36) is open to said seal chamber (44) and a second end of said drain passage (36) is open to an area external to said seal chamber (44) and is adapted to be closed by a removable closure (38).

4. The steering live spindle wheel end assembly (1) as defined in claim 3, wherein said removable closure (38) is a threaded plug (38).

5. The steering live spindle wheel end assembly (1) as defined in claim 1, wherein said first seal member (40) is in sliding sealing contact with said spindle assembly (4) and said second seal member (42) is in sliding sealing contact with said drive shaft (12).

6. The steering live spindle wheel end assembly (1) as defined in claim 1, wherein said spindle assembly (4) includes a wheel hub member (5) and a coupling ring member (16) provided for drivingly coupling said wheel hub member (5) to said drive shaft (12).

7. The steering live spindle wheel end assembly (1) as defined in claim 6, wherein said at least one outlet passageway (24) is formed through said coupling ring member (16).

8. The steering live spindle wheel end assembly (1) as defined in claim 7, wherein said first seal member is in sliding contact with said coupling ring member (16) of said spindle assembly (4).

9. The steering live spindle wheel end assembly (101) as defined in claim 1, wherein said spindle assembly (104)

includes a wheel hub member (105) drivingly coupled to said drive shaft (12).

10. The steering live spindle wheel end assembly (101) as defined in claim 9, wherein said outlet passageway (24) is formed through said wheel hub member (105).

11. The steering live spindle wheel end assembly (101) as defined in claim 10, wherein said first seal member is in sliding contact with said wheel hub member (105) of said spindle assembly and said second seal member is in sliding contact with said drive shaft (12).

12. The steering live spindle wheel end assembly (1) as defined in claim 1, wherein said drive shaft (12) includes a substantially cylindrical flange portion (12a) and a splined end (12b) non-rotatably coupled to said spindle assembly (4).

13. The steering live spindle wheel end assembly (1) as defined in claim 12, wherein said second seal member (42) is non-rotatably mounted relative to said steering knuckle (10) and is in sliding sealing contact with said cylindrical flange portion (12a) of said drive shaft (12).

14. A vehicle steering live spindle wheel end assembly (1) including a tire inflation system providing pressurized air to a pneumatic tire directly through said wheel end assembly (1), said wheel end assembly (1) comprising:

a steering knuckle (10) having an inlet passageway (11) formed directly therethrough, said inlet passageway (11) connected to a source of pressurized air;

a spindle assembly (4) rotatably mounted to said steering knuckle (10) and including a wheel hub member (5) and a coupling ring member (16) non-rotatably coupled to said wheel hub member, said coupling ring member (16) having a plurality of outlet passageways (24) formed therethrough, said outlet passageways (24) being in fluid communication with a pneumatic tire at outward ends of said outlet passageways (24);

a drive shaft (12) rotatably mounted within said steering knuckle (10) and drivingly coupled to said spindle assembly (4), said drive shaft (12) includes a substantially cylindrical flange portion (12a) and a splined end (12b) non-rotatably coupled to said coupling ring member (16) of said spindle assembly (4);

a slip-ring seal assembly (30) including a seal carrier (32) non-rotatably mounted to said steering knuckle (10), a first seal member (40) and a second seal member (42) both extending from said seal carrier (32) in axially spaced relationship so as to define a rolling seal chamber (44) between said first seal member (40) and said second seal member (42);

said first seal member (40) being in sliding sealing contact with said coupling ring member (16) of said spindle assembly (4) and said second seal member (42) being in sliding sealing contact with said cylindrical flange portion (12a) of said drive shaft (12);

said seal carrier (32) including a communication hole (34) aligned with said inlet passageway (11) in said steering knuckle (10) to provide a fluid communication between said inlet passageway (11) and said rolling seal chamber (44) and a drain passage (36) provided to remove any contamination from said seal chamber (44), a first end of said drain passage (36) is open to said seal chamber (44) and a second end of said drain passage (36) is open to an area external to said seal chamber (44) and is adapted to be closed by a removable threaded plug (38); and said outlet passageways (24) being in fluid communication with said rolling seal chamber (44) thereby establishing a fluid communication path between said source of pressurized air and said pneumatic tire.

15. A vehicle steering live spindle wheel end assembly (101) including a tire inflation system providing pressurized air to a pneumatic tire directly through said wheel end assembly (101), said wheel end assembly (101) comprising:

a steering knuckle (10) having an inlet passageway (11) formed directly therethrough, said inlet passageway (11) connected to a source of pressurized air;

a wheel hub member (105) rotatably mounted to said steering knuckle (10), said wheel hub member (105) having a plurality of outlet passageways (124) formed therethrough, said outlet passageways (124) being in fluid communication with a pneumatic tire at outward ends of said outlet passageways (124);

a drive shaft (12) rotatably mounted within said steering knuckle (10) and drivingly coupled to said wheel hub member (105), said drive shaft (12) includes a substantially cylindrical flange portion (12a) and a splined end (12b) non-rotatably coupled to said wheel hub member (105);

a slip-ring seal assembly (30) including a seal carrier (32) non-rotatably mounted to said steering knuckle (10), a first seal member (40) and a second seal member (42) both extending from said seal carrier (32) in axially spaced relationship so as to define a rolling seal chamber (44) between said first seal member (40) and said second seal member (42);

said first seal member (40) being in sliding sealing contact with said wheel hub member (105) and said second seal member (42) being in sliding sealing contact with said cylindrical flange portion (12a) of said drive shaft (12);

said seal carrier (32) including a communication hole (34) aligned with said inlet passageway (11) in said steering knuckle (10) to provide a fluid communication between said inlet passageway (11) and said rolling seal chamber (44) and a drain passage (36) provided to remove any contamination from said seal chamber (44), a first end of said drain passage (36) is open to said seal chamber (44) and a second end of said drain passage (36) is open to an area external to said seal chamber (44) and is adapted to be closed by a removable threaded plug (38); and said outlet passageways (124) being in fluid communication with said rolling seal chamber (44) thereby establishing a fluid communication path between said source of pressurized air and said pneumatic tire.

* * * * *